(12) United States Patent
Dezutter et al.

(10) Patent No.: US 7,201,825 B2
(45) Date of Patent: Apr. 10, 2007

(54) PROCESS FOR MAKING A FLOWABLE AND METERABLE DENSIFIED FIBER PARTICLE

(75) Inventors: Ramon C. Dezutter, Milton, WA (US); Michael R. Hansen, Seattle, WA (US)

(73) Assignee: Weyerhaeuser Company, Federal Way, WA (US)

( * ) Notice: Subject to any disclaimer, the term of this patent is extended or adjusted under 35 U.S.C. 154(b) by 233 days.

(21) Appl. No.: 10/280,439

(22) Filed: Oct. 25, 2002

(65) Prior Publication Data

US 2004/0079499 A1 Apr. 29, 2004

(51) Int. Cl.
*D21F 11/00* (2006.01)
*D21C 9/00* (2006.01)
*D21B 1/14* (2006.01)

(52) U.S. Cl. .......................... 162/9; 162/13; 162/158; 162/161; 162/181.1; 162/205; 162/194; 162/100; 264/153

(58) Field of Classification Search ................ 162/9, 162/100, 157.6, 158, 156, 147, 181.1, 181.2, 162/179, 181.8, 152, 157.1, 159, 205, 138, 162/194, 204, 10–13; 428/393, 402, 532, 428/535, 536, 537.1, 375, 323; 241/57, 189.1; 34/316, 375, 576, 359–360; 264/140, 145, 264/153, 157, 160
See application file for complete search history.

(56) References Cited

U.S. PATENT DOCUMENTS

| 4,253,822 | A | * | 3/1981 | Marsh .......................... 432/14 |
| 4,365,761 | A | | 12/1982 | Danforth |
| 5,104,047 | A | | 4/1992 | Simmons |
| 5,262,005 | A | * | 11/1993 | Eriksson et al. ............ 162/100 |
| 6,748,671 | B1 | * | 6/2004 | Vrbanac et al. ............... 34/427 |
| 6,769,199 | B2 | * | 8/2004 | Vrbanac et al. ............... 34/359 |
| 6,782,637 | B2 | * | 8/2004 | Yancey et al. ................ 34/221 |
| 6,862,819 | B2 | * | 3/2005 | Vrbanac et al. ............... 34/221 |
| 6,865,822 | B2 | * | 3/2005 | Vrbanac et al. ............... 34/427 |
| 6,910,285 | B2 | * | 6/2005 | Vrbanac et al. ............... 34/576 |
| 2002/0155292 | A1 | | 10/2002 | Sealey, II et al. |
| 2003/0093916 | A1 | * | 5/2003 | Vrbanac et al. ............... 34/359 |
| 2003/0140519 | A1 | * | 7/2003 | Vrbanac et al. ............... 34/427 |
| 2003/0141028 | A1 | * | 7/2003 | Vrbanac et al. .......... 162/157.6 |
| 2003/0186052 | A1 | | 10/2003 | Crews et al. |
| 2003/0192659 | A1 | * | 10/2003 | Yancey et al. ................. 162/9 |
| 2004/0041040 | A1 | * | 3/2004 | Dezutter et al. .............. 241/16 |
| 2004/0043217 | A1 | * | 3/2004 | Dezutter et al. ............. 428/407 |
| 2004/0081828 | A1 | * | 4/2004 | Dezutter et al. ............. 428/393 |
| 2004/0123483 | A1 | * | 7/2004 | Vrbanac et al. ............... 34/356 |
| 2004/0129808 | A1 | * | 7/2004 | Crane et al. ................... 241/57 |
| 2004/0169306 | A1 | | 9/2004 | Crews et al. |
| 2004/0177936 | A1 | * | 9/2004 | Vrbanac et al. ................. 162/9 |

FOREIGN PATENT DOCUMENTS

| CA | 2442886 A1 * | 4/2004 |
| DE | 27 04 035 A1 | 2/1977 |
| DE | 28 52 656 A1 | 12/1978 |
| GB | 322997 | 12/1929 |
| GB | 888845 * | 2/1962 |
| GB | 888845 A * | 2/1962 |
| GB | 2393501 A * | 3/2004 |
| JP | H07-267708 | 10/1995 |
| JP | 2000-328417 | 11/2000 |
| JP | 2004143658 A * | 5/2004 |
| WO | WO 92/01833 | 2/1992 |
| WO | WO 9411432 A1 * | 5/1994 |

* cited by examiner

*Primary Examiner*—José A. Fortuna
(74) *Attorney, Agent, or Firm*—Christensen O'Connor Johnson Kindness

(57) ABSTRACT

Discrete particles of cellulosic material are flowable and meterable. They are easily dispersible in an aqueous or a dry medium. The particles comprise singulated cellulose fibers that have been densified. The particles have a density of at least 0.3 g/cc.

13 Claims, No Drawings

PROCESS FOR MAKING A FLOWABLE AND METERABLE DENSIFIED FIBER PARTICLE

FIELD OF THE INVENTION

The present invention relates to a process for making a flowable and meterable densified fiber particle and the process for making that particle. The product easily disperses in water or in a dry medium with mechanical action, and is particularly useful as an additive to cementitious compositions.

BACKGROUND OF THE INVENTION

Cellulose fiber is normally wet formed on a Fourdrinier screen and pressed into a sheet. The sheet is dewatered, dried and rolled into large rolls for storage and shipment to customers. In order to use the pulp, the customer normally introduces the sheets into a hammermill or dicer to separate and singulate the fibers, that is, separate the sheet into small segments or individual fibers, which then form a fluff pulp for use by the customer.

For some uses, the fluff pulp can be used directly, for example, for producing an airlaid absorbent product. However, for many other uses, including, but not limited to, absorbent products and as an additive for cementitious materials and molded or extruded polymeric products, the pulp must be dispersed into an aqueous medium. The fluff pulp, however, is not readily flowable and/or meterable for precise measurement for mixing when used, for example, in cementitious or polymeric products.

SUMMARY OF THE INVENTION

The present invention provides a pulp product that is not only easily dispersed into an aqueous or dry medium, but also is flowable and meterable so that it can be transported and measured in precise quantities for batch or continuous processing into end products such as cementitious, polymeric or other products made with fluff pulp. The product itself comprises a flowable, meterable, and easily dispersible cellulose fiber material. The material comprises a plurality of discrete particles, each of which comprises a plurality of singulated and densified cellulose fibers. These particles will easily slide or flow past each other so they can be easily transported using conventional material handling equipment for particulates. In one embodiment, the particles are relatively flat and have a total surface area of at least about 10 sq. mm. It is preferred that the particles have a density greater than or equal to 0.3 g/cc.

The invention also provides a process for producing flowable meterable cellulose particles that are easily dispersible into an aqueous or dry medium. The process comprises first singulating cellulose fibers to form a mass of singulated, unbonded fibers, and thereafter densifying the singulated fibers and forming the fibers into discrete particles each comprising a plurality of unbonded fibers. The particles may be formed first by densifying the singulated fibers and then forming the discrete particles. The particles may also be made by simultaneously densifying and forming the particles, or by separating and densifying groups of fibers into discrete particles.

DETAILED DESCRIPTION OF THE PREFERRED EMBODIMENT

Cellulose fibers are converted into a flowable and meterable form in accordance with the present invention. The present invention comprises a plurality of discrete particles. Each of the discrete particles are in turn composed of a plurality of pulp fibers. The discrete particles are produced from singulated pulp fibers, which are then densified and formed into the discrete particles. The discrete particles are not only meterable and flowable utilizing conventional material handling equipment, but when placed in either an aqueous or a dry medium are easily and readily dispersible into a plurality of singulated pulp fibers. Dispersion in an aqueous medium usually requires slight agitation to cause relative movement of the medium and fiber. Dispersion in a dry medium requires mechanical mixing to cause relative movement of the medium and the fibers. These particles are especially useful in the manufacture of end products in which the fibers function as a filler and strengthening agent. Examples of such materials include cementitious products, such as wall panels, and molded and extruded products made from polymeric materials.

The singulated fibers can be produced in a variety of ways. Pulp sheets produced in conventional pulp mills may be introduced into a hammermill and separated into individual fibers to form the singulated pulp fibers usable in the present invention. Alternatively, the singulated pulp fibers can be produced by introducing never dried pulp directly from a pulp mill into a jet drier to simultaneously dry and singulate the pulp fibers. Methods for making singulated pulp fibers in this manner are disclosed in co-pending U.S. patent application Ser. No. 09/998,143, filed on Oct. 30, 2001, entitled Process to Produce Dried Singulated Cellulose Pulp Fibers, and U.S. patent application Ser. No. 10/051,872, filed on Jan. 16, 2002, entitled Process for Producing Dried Singulated Crosslinked Cellulose Pulp Fibers. These applications are hereby expressly incorporated herein by reference in their entirety.

A wide variety of pulps can be utilized for producing the singulated pulp fibers particularly usable in the present invention. Any kraft, sulfite, soda or alkaline cooking process is considered suitable for obtaining pulp for use in the present invention. Suitable pulps for use in the invention can also be obtained from mechanical pulping processes such as thermomechanical pulp, chemithermomechanical pulp, refiner mechanical pulp, and stone groundwood. A particularly useful pulp for end use in cementitious materials has a low chemical oxygen demand and is described in U.S. patent application Ser. No. 10/209,497, filed on Jul. 30, 2002, entitled Very Low COD Unbleached Pulp. This application is hereby expressly incorporated by reference in its entirety. Another pulp that is usable in accordance with the present invention is sold under the name TYEE by the Weyerhaeuser Company of Tacoma, Wash. TYEE pulp is a bleached softwood pulp made from sawdust.

The cellulose fibers from which the pulp is derived can be from any wood or non-wood source. Of all the cellulose fiber sources, wood pulp is the most preferred because of its availability and price. Natural sources of cellulose fibers include softwood species, including southern pine, Douglas fir, spruce, hemlock, and Radiata pine. In addition to these softwood fiber sources, pulps can also be produced from hardwood species, such as eucalyptus. Non-wood cellulose fibers can also be used, including straw, flax, kenaf, hemp, jute, bagasse, sisal, or similar materials. Like wood-based fibers, non-wood fiber sources may also be pulped and subsequently used to provide the pulp for producing the singulated pulp fibers usable in accordance with the present invention.

Suitable adjuvants, such as other fibers, natural or synthetic, and/or any chemical treatments, may also be mixed with the pulp prior to processing in accordance with the present invention. Suitable adjuvants include coupling agents, silicates, zeolites, latices, crosslinkers, debonders, surfactants, dispersants, clays, carbonates, biocides, dyes, antimicrobial compositions, flame retardants, preservatives, synthetic fibers (such as polypropylene, polyester, polyamide, rayon lyocell), glass fibers, carbon fibers, and any other natural fibers (such as wool and silk and different species of wood or non-wood fibers such as hardwood, softwood, OCC, ONP, cotton, straw, flax, hemp, jute, bagasse, sisal, and kenaf and similar materials). Coupling agents are used, for example, to better bond the fibers to a matrix. Other examples of suitable adjuvants are described on pages 194–206 of the *Handbook of Pulping and Papermaking*, 2d ed., by Christopher J. Biermann (Biermann), these pages are incorporated herein by reference in their entirety. Other adjuvants for pulp are described in U.S. application Ser. No. 10/187,213, filed on Jun. 28, 2002, entitled Process for Producing Dried Singulated Cellulose Pulp Fibers Using a Jet Drier and Injected Steam and the Product Resulting Therefrom, the disclosure of which is incorporated herein by reference in its entirety.

The singulated fibers produced as above are then densified in accordance with the present invention. The fibers may be separately densified by any of several conventional methods. One common form of densifying is to run a loosely bound mass of singulated fibers between a pair of nip rolls which compresses them into a loosely bound sheet. If desired, the singulated pulp fibers can be airlaid in a conventional air laying machine. The airlaid pad can then be densified or compressed by conventional methods and then formed into a plurality of discrete particles using rotary punches or rotary dies. It is believed that this form of densification mechanically bonds the fiber, although some ionic binding may also occur. The sheet of densified fibers is then cut, shaped, or otherwise formed into discrete particles. Each of the particles comprises a plurality of singulated pulp fibers that are mechanically bound together. A variety of methods can be utilized to form the fibers into discrete particles. These methods include, but are not limited to, cutting, dicing, rotary punching, and rotary die cutting. Other known methods may be used as well.

The singulated pulp fibers may also be simultaneously densified and formed into discrete particles. A variety of conventional equipment can be utilized for this purpose. Rotary type molds can be utilized, for example, to make discrete particles in the form of briquettes from the mass of singulated pulp fibers. In a rotary type mold, the singulated pulp fibers are simultaneously compressed and molded into cavities on matching rolls similar to nip rolls. The mass of singulated pulp fibers can also be introduced between a set of matching gears between which the pulp is compressed between the gear to gear interspaces.

The flowable and meterable discrete particles produced in accordance with the present invention preferably have a density greater than or equal to 0.3 g/cc. It is preferred that the density be between 0.3 g/cc and 2 g/cc and most preferably between 0.3 g/cc and 1 g/cc. There are no specific requirements for shape. However, the particles must be sufficiently small to flow past each other and must be meterable, all utilizing conventional material handling equipment for a particulate material. When the particles are generally flat as occurs when a sheet is cut or punched into discrete particles, it is preferred that the total surface area on both sides of the flat particles be from 10 to 150 sq. mm. and that the thickness be on the order of 0.5 to 10 mm, and preferably 2 to 5 mm. The flowable and meterable discrete particles made in accordance with the present invention, when introduced into an aqueous or dry medium, are very readily and easily dispersible, separating almost immediately into separate or singulated fibers in the medium.

EXAMPLES

The following examples are intended to be illustrative of the present invention and are not intended in any way to limit the scope of the invention as defined herein.

Example 1

Singulated pulp fibers were taken directly off the screen conveyor of a jet drier that had singulated and dried previously never-dried Kraft pulp. The singulated pulp fibers were run through a nip roll to form a densified fiber mat. The densified mat had a sheet thickness of 0.05 inches. The sheet was then cut into ¼ inch squares. The squares flowed easily past each other on an inclined surface. When approximately 20 squares so produced were placed in a 500 ml beaker of warm water, they dispersed fully and quickly in less than one minute with slight agitation.

Example 2

Singulated pulp fibers taken from a screen conveyor of a jet drier, as in Example 1, were inserted into a pad former. The pad former is sold under the trade name Pocket Former and is available from Automated Systems of Tacoma, Wash. The pads were approximately 4 inches×12 inches. These pads were run through a nip press until they were approximately ⅛ inch thick. A single stroke metal punch was set up with a ¼ inch×¾ inch slot. The densified sheet was then punched through this slot with a similarly sized punch. The plugs from the punched sheet comprise discrete particles. The main portion of the body of the discrete particles so produced were not further densified relative to the material taken from the nip press; however, the edges were completely pressed and sealed. These edges held the shape of the plug together. A plurality of the plugs easily flowed past each other on an inclined surface. When 10 plugs were placed in a 9500 ml beaker of warm water, they fully and quickly dispersed in less than one minute with slight agitation. There were no visible knits or knots due to the shearing and compression action of the punch.

Example 3

A control particle was produced from a conventional Kraft pulp sheet. The Kraft sheet was produced in the conventional manner on a Fourdrinier press and then dried. The fibers from the mat were not singulated or otherwise separated into individual fibers. The Kraft sheet was cut into squares approximately ¼ inch on a side similar to those in Example 1. When these squares were inserted in a beaker of warm water and stirred, no sign of dispersion was observed after one minute and the test was stopped.

While the preferred embodiment of the invention has been illustrated and described, it will be appreciated that various changes can be made therein without departing from the spirit and scope of the invention.

The embodiment of the invention in which an exclusive property or privilege is claimed are defined as follows:

1. A process for producing a readily dispersible, flowable, and meterable cellulosic product consisting essentially of:
    singulating cellulose fibers derived from softwood by introducing never dried pulp fibers into a jet drier and drying and singulating the pulp fibers therein to form a mass consisting essentially of dried, singulated cellulose fibers and
    densifying the mass of dried singulated fibers and forming the fibers into discrete particles, each of said discrete particles consisting essentially of a plurality of dried, singulated cellulose fibers and that are mechanically bonded together, said particles dispersing into singulated fibers in less than one minute with agitation.

2. The process of claim 1, wherein said fibers are densified by passing the mass of singulated fibers through a pair of nip rolls to produce a mat of densified fibers.

3. The process of claim 2, wherein said densified fibers are formed into discrete particles by cutting said mat of densified fibers into a plurality of discrete particles.

4. The process of claim 2, wherein said fibers are formed into discrete particles by punching said mat of densified fibers to form discrete particles.

5. The process of claim 1, wherein said fibers are simultaneously densified and formed by introducing said singulated cellulose fibers into a rotary die to form discrete particles.

6. The process of claim 1, wherein said discrete particles have a density of at least 0.3 g/cc.

7. The process of claim 6, wherein said density ranges from 0.3 to 2 g/cc.

8. The process of claim 6, wherein said density ranges from 0.3 to 1 g/cc.

9. The process of claim 6, wherein said particles are generally flat and have a total surface area of at least 10 sq. mm.

10. The process of claim 9, wherein said particles have a surface area of about 10 to about 150 sq. mm.

11. The process of claim 1, wherein said particles have a thickness of 0.5 mm or greater.

12. The process of claim 11, wherein said thickness ranges from 0.5 to 10mm.

13. The process of claim 1, wherein said cellulose fibers further comprise an adjuvant selected from the group consisting of coupling agents, silicates, zeolites, latices, crosslinkers, debonders, surfactants, dispersants, clays, carbonates, biocides, dyes, antimicrobial compositions, flame retardants, and preservatives.

* * * * *